(12) United States Patent
Dupre et al.

(10) Patent No.: US 8,120,260 B2
(45) Date of Patent: Feb. 21, 2012

(54) WIRELESS CONVENIENCE LIGHTING SYSTEM AND METHOD OF MAKING SAME

(75) Inventors: Scott Dupre, Fall River, MA (US); Ken Czech, Dartmouth, MA (US); Aslam Khazi, Barrington, RI (US); Marcus Poisson, Pawtucket, RI (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 350 days.

(21) Appl. No.: 12/407,697

(22) Filed: Mar. 19, 2009

(65) Prior Publication Data

US 2010/0237783 A1 Sep. 23, 2010

(51) Int. Cl.
*H05B 37/02* (2006.01)

(52) U.S. Cl. ........... 315/149; 315/86; 315/297; 315/307

(58) Field of Classification Search .............. 315/86, 315/149, 291, 294, 297, 307; 362/20, 233, 362/362
See application file for complete search history.

(56) References Cited

U.S. PATENT DOCUMENTS

| | | | |
|---|---|---|---|
| 5,336,977 A * | 8/1994 | Li | 315/159 |
| 6,828,733 B1 * | 12/2004 | Crenshaw | 315/150 |
| 6,848,798 B1 * | 2/2005 | Logan et al. | 362/20 |
| 2002/0140360 A1 * | 10/2002 | Crenshaw | 315/149 |
| 2005/0088100 A1 * | 4/2005 | Chen et al. | 315/86 |
| 2008/0180935 A1 * | 7/2008 | Burdeen et al. | 362/20 |
| 2010/0271802 A1 * | 10/2010 | Recker et al. | 362/20 |
| 2010/0327766 A1 * | 12/2010 | Recker et al. | 315/291 |

* cited by examiner

*Primary Examiner* — Tung X Le

(57) ABSTRACT

A wireless convenience lighting system, comprises a base unit, the base unit connectable to an AC power supply, the base unit having a transmitter structure emitting at least one signal indicating one of an AC power loss or the AC power on, a remote lighting unit having a light source, and auxiliary power supply and a receiver structure, the receiver structure receiving the signal from the base unit, the base unit wirelessly activating the light source of the remote lighting unit when the AC power is lost.

6 Claims, 8 Drawing Sheets

WIRELESS CONVENIENCE LIGHTING SYSTEM AND METHOD OF MAKING SAME

CROSS-REFERENCE TO RELATED DOCUMENTS

None

TECHNICAL FIELD

This invention pertains to a convenience lighting system for egress during a loss of power. More specifically the invention pertains to a wireless convenience lighting system which may be easily retro-fit into a finished structure and utilized to illuminate a path of egress or provide convenience lighting during a loss of power.

BACKGROUND

Emergency lighting systems typically consist of one or more emergency lighting units which are positioned at pre-selected locations within a building, and which are hard wired into the electrical system of the building. These emergency lighting systems typically utilize a rechargeable battery, which is maintained in a charged state by the electrical system. During a power outage or failure, a relay in the emergency lighting system senses the power failure and activates one or more of the lighting sources of the emergency lighting system to provide safety and egress lighting.

In order to install an emergency system into an existing building, home or other structure current emergency lighting systems require hard wiring which is extremely costly and labor intensive in a finished building. It would be highly desirable to provide an emergency lighting system, which could be retro-fit into an existing building at a decreased cost as compared to existing systems.

SUMMARY

A wireless convenience lighting system, comprises a base unit, the base unit connectable to an AC power supply, the base unit having a transmitter structure emitting at least one signal indicating one of an AC power loss or the AC power on, a remote lighting unit having a light source, and auxiliary power supply and a receiver structure, the receiver structure receiving the signal from the base unit, the base unit wirelessly activating the light source of the remote lighting unit when the AC power is lost. The wireless convenience lighting system wherein the auxiliary power supply is a DC power supply. The wireless convenience lighting system wherein the auxiliary power supply is a battery. The wireless convenience lighting system wherein the base unit is a plug-in base unit connectable to a wall outlet. The wireless convenience lighting system further comprising an auxiliary power supply within the base unit.

The wireless convenience lighting system wherein the auxiliary power supply within the base unit being a capacitor system. The wireless convenience lighting system wherein the capacitor system providing power for the transmitter to emit the at least one signal. The wireless convenience lighting system wherein the transmitting structure includes an RF transmitter.

A wireless lighting system for emergency egress, comprising a plug-in base unit, the plug-in base unit connectable to an AC power supply for monitoring line voltage, the base unit having a transmitter, the transmitter emitting at least one wireless signal to a remote lighting unit in response to a change in power condition, the remote lighting unit having a receiver for receiving the wireless signal from the transmitter, the plug-in base unit sending the signal to the remote lighting unit during one of a power loss or a power on condition, the remote lighting unit activating a light source in response to said wireless signal. The wireless lighting system for emergency egress, wherein the remote lighting unit is turning on the light source when power is lost. The wireless lighting system for emergency egress, wherein the remote lighting unit is turning off the light source when power is restored. The wireless lighting system for emergency egress wherein the transmitter emitting the signal upon a loss of AC power from the AC power supply. The wireless lighting system for emergency egress wherein the transmitter emits the signal continuously and stops upon a loss of AC power from the AC power supply. The wireless lighting system for emergency egress further comprising a capacitor system on the plug-in base unit. The wireless lighting system for emergency egress further comprising a battery on the remote lighting unit. The wireless lighting system further comprising a receiver structure positioned in the remote lighting unit for receiving the wireless signal.

A wirelessly activated lighting system comprises a power sensing base module which may be plugged into the wall outlet to monitor AC voltage, the base module having a transmitter which sends a wireless signal to a remote lighting module, the wireless signal changing from one of off or on to the other of off or on upon a change in the AC voltage, the remote lighting unit having a receiver which receives the wireless signal, an auxiliary power source and at least one luminaire, the remote lighting unit activating the luminaire upon recognizing the change in the wireless signal.

A method of wirelessly illuminating an area, comprising the steps of providing a plug-in wall unit and a remote lighting unit, monitoring an AC power supply with the plug-in wall unit, providing a first signal state in a first AC power condition, monitoring for a change in the first signal state to a second signal state from the plug-in wall unit to the remote lighting unit if a second AC power condition occurs, illuminating a light source in the remote lighting unit when the signal state changes. The method wherein the first signal state comprises one of sending a signal or not sending a signal. The method wherein the second signal state comprises the other of sending a signal or not sending a signal. The method further comprising a step of monitoring ambient light in the area of the remote light unit. The method further comprising a step of inhibiting illumination of the light source if the ambient light is above a preselected level. The method of wirelessly illuminating an area wherein the signal is an RF signal. The method of wirelessly illuminating an area wherein the change in the signal state causes illumination of the light source.

A method of wireless illumination, comprises plugging-in a power sensing base module into a first power supply, monitoring the first power supply with the base module, one of transmitting a signal or not transmitting a wireless signal from the base module to define a first wireless signal state, detecting a change in condition of the first power supply, illuminating a remote light unit powered by a second power supply on-board the remote light unit based on the change in condition of the first wireless signal state.

A method of wireless illumination comprising the steps of monitoring a first power supply with a plug-in base unit, one of transmitting or not transmitting a wireless signal to define a first wireless signal condition, detecting a change in condition of said first wireless signal condition to a second wireless signal condition, determining an ambient light level in an area of a remote lighting unit, illuminating the remote lighting unit if the ambient light level is below a preselected level.

BRIEF DESCRIPTION OF THE ILLUSTRATIONS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION

Figure 1:
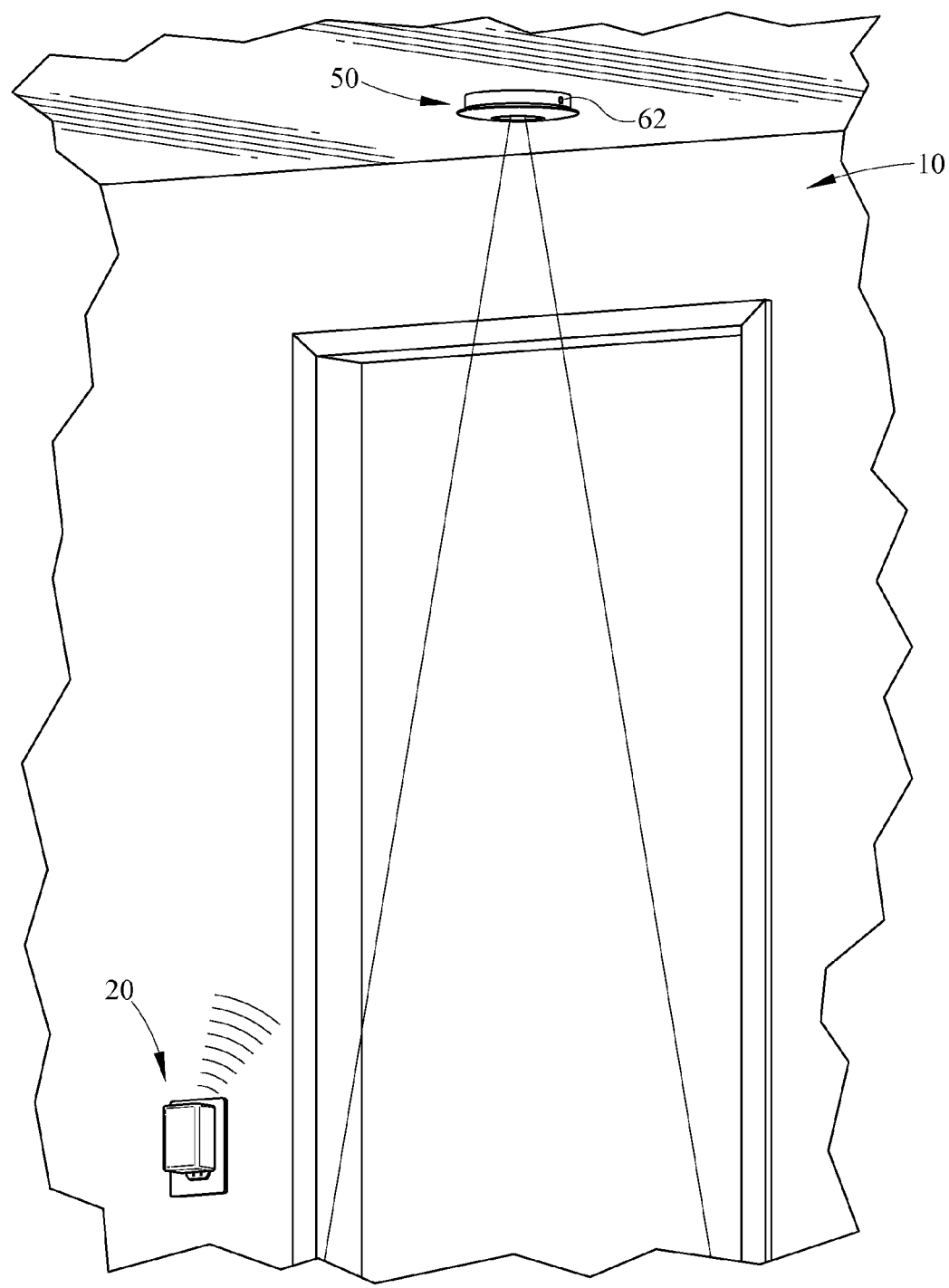
FIG. 1 is an upper perspective view the wireless convenience lighting system in a building.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

In addition, it should be understood that embodiments of the invention include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software. As such, it should be noted that a plurality of hardware and software-based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible.

Referring now in detail to the drawings, wherein like numerals indicate like elements throughout the several views, there are generally shown in FIGS. 1-8 a wireless convenience lighting system and method of using same. The instant wireless convenience lighting system senses a loss of alternating current (AC) power and changes a signal condition. The signal condition is received by a remote illumination unit, which powers a light using an alternate power supply in order to illuminate a path of egress despite the loss of AC power in the building. This system may be retrofit into an existing building without the normal damage caused by the connection of the new wiring into the existing wiring of the existing electrical system.

Referring initially to FIG. 1, a perspective view of the wireless convenience lighting system 10 is depicted. The system 10 comprises a base unit 20 and a remote lighting unit 50. The base unit 20 monitors an AC power supply within a building and notifies the remote lighting unit 50 upon a loss of power. When a loss of power is detected, notification of the power loss occurs by a change in signal condition between the base unit 20 and the remote light unit 50 causes the light source to turn on. The device may also comprise a photosensor or photoresistor aperture 62 for detecting a minimum amount of daylight and determining if the light source needs to be turned on. Additionally, the base unit 20 may also comprise a dimmer control, occupancy sensor, ambient light sensor, or other desired control functions.

Figure 2:
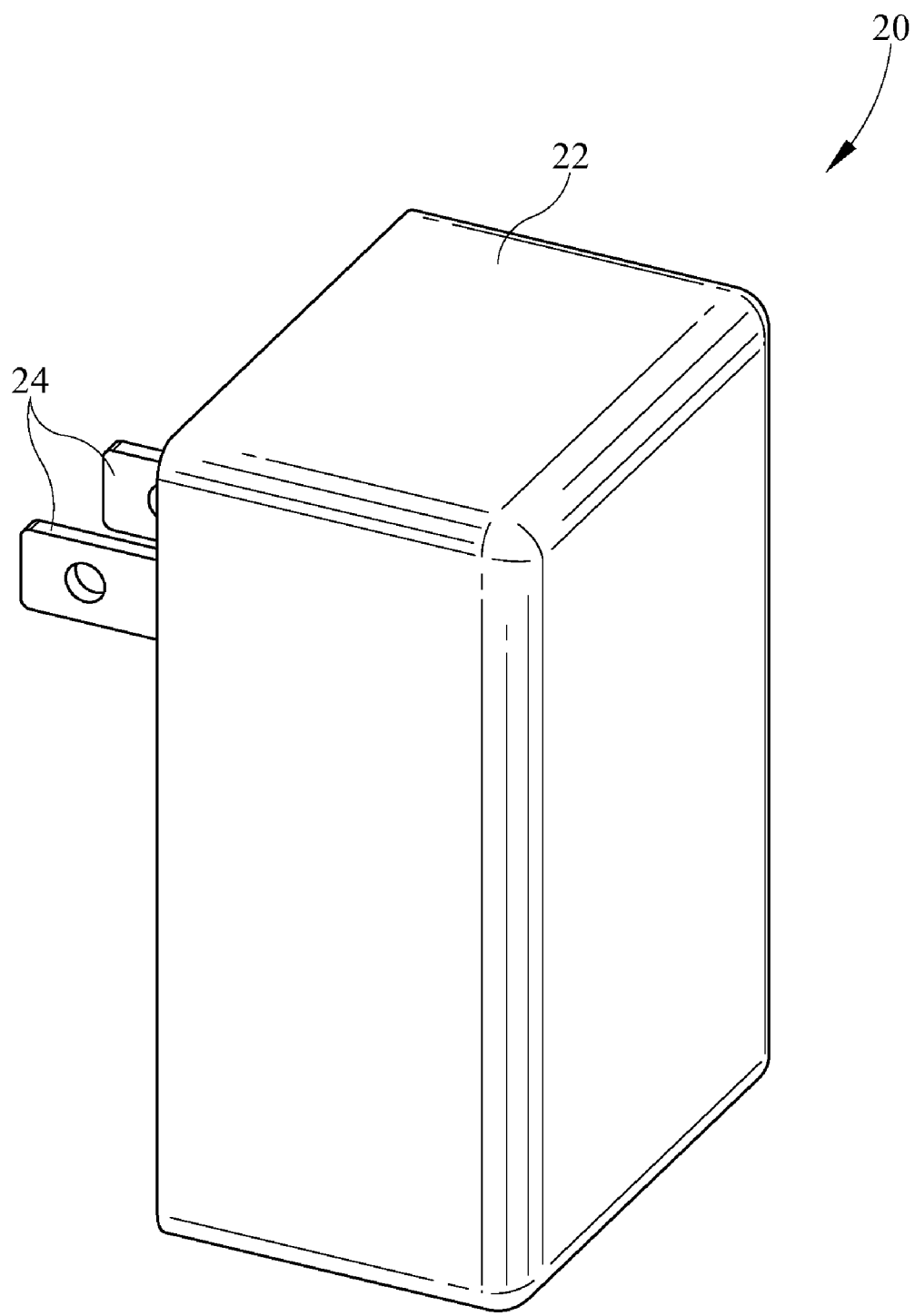
FIG. 2 is a perspective view of a base unit of the wireless convenience lighting system of FIG. 1.

Referring now to FIG. 2, a perspective view of the base unit 20 is depicted. The base unit 20 comprises a housing 22 and AC electrical connectors 24. The exemplary connectors 24 are suitable for 120 voltage outlet, which is typical in both residential and commercial structures. However, alternative electric connectors may be utilized, such as 240 volt connectors or other known connectors for residential or commercial power systems. As shown in FIG. 1, the base unit 20 is plugged into a typical 120 volt wall outlet of a room. This ability eliminates the need for hard wiring of the system 10 into the existing electrical systems. This also reduces the installation costs and ultimately reduces the disturbance to the finished structure where the system 10 is being installed.

Once the base unit 20 is plugged into a wall outlet, the base unit may easily monitor AC power in the building structure. The base unit 20 either emits a continuous signal or does not emit a signal. At time of power loss, the signal condition changes as will be described further herein. This change in signal condition is part of a process wherein the remote light unit may be powered for lighting by an alternate power supply.

Figure 3:
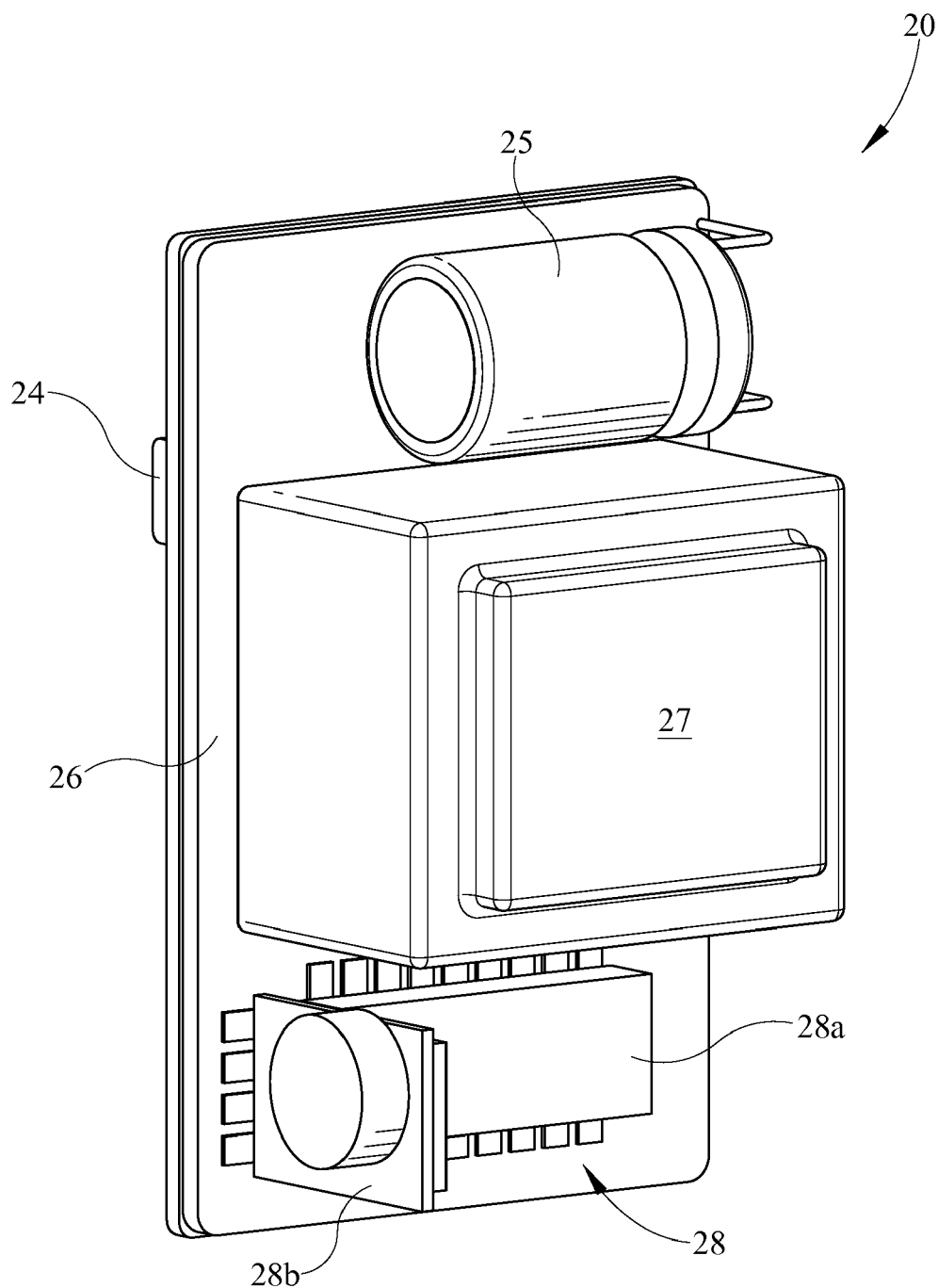
FIG. 3 is a perspective view of the base unit of the wireless convenience lighting system of FIG. 2 with the housing removed.

Referring now to FIG. 3, a perspective view of the base unit 20 is shown with the housing 22 removed and the exemplary internal components shown. The base unit 20, which is commonly referred to as a wall-wart, includes an internal circuit board 26. The conductive circuit board 26 may be formed of, for example, aluminum or reinforced fiberglass, such as FR 04 board. Near the upper portion of the upper circuit board 26 is a capacitor structure 25. The capacitor structure 25 stores a limited amount of power so that when AC power is lost in the building, a transmitter structure 28 still has a limited power supply to send a signal, at least according to one exemplary embodiment. Additionally, the base unit 20 may comprise a logic chip or a circuit which determines either or any combination of voltage loss or current loss in the AC power supply to determine a drop or complete loss of AC power.

Beneath the capacitor structure 25 is a transformer 27. The voltage into the base unit 20 according to the exemplary embodiment is 120 volts. However, the voltage has to be stepped down to a lower voltage to operate the transmitter 28. According to the exemplary embodiment, the transformer 27 steps the voltage down from 120 volts to 9 volts, although other voltages may be utilized depending on the circuitry utilized.

At the lower end of the circuit board 26 is the transmitter structure 28. The transmitter structure 28 includes an encoder 28a and an RF transmitter 28b. The encoder 28a provides an encoded signal which is encoded is sent by the transmitter 28b and which is subsequently decoded by a receiver structure on a remote lighting unit 50.

It should be understood to one skilled in the art that the capacitor and transformer structures 25, 27 could be replaced with alternate circuitry in order to perform the desired functions. Therefore the structure described in the base unit 20 should not be considered limiting but merely exemplary of one embodiment for performing the described functions. It should be understood that a battery may be substituted for the capacitor 25 and the battery may be rechargeable from the AC power supply.

Figure 4:
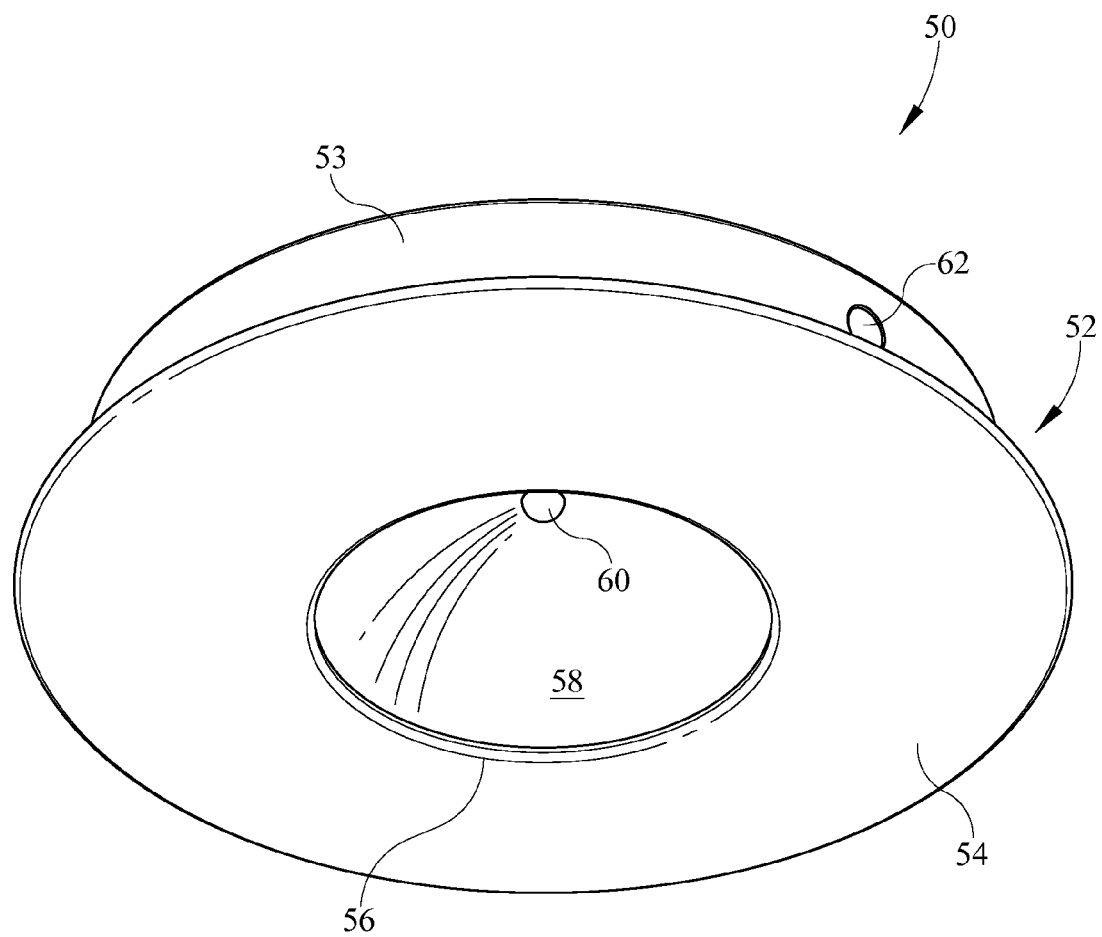
FIG. 4 is a lower perspective view of remote lighting unit.

Referring now to FIG. 4, the remote lighting unit 50 is depicted in a lower perspective view. The remote lighting unit 50 has a housing 52 including an upper portion 53 and a lower portion 54. The lower portion, or decorative face 54, may have some curvature or may be flat. The lower rim also comprises an inner edge 56 defining an opening. Inside of the edge 56, is a diffuser or reflector 58 with at least one light source 60. The reflector or diffuser 58 may be formed of a reflective metallic material that is coated or polished to a desirable finish and in order to provide a lighting output, in combination with the lamp or light source 60. Alternatively, the reflector may be formed of an acrylic or other polymer, which is coated with a reflective coating to direct light downward through the opening 56. The light source may be an LED, incandescent, fluorescent, compact fluorescent, metal halide, or other known or unknown type lamp. The exemplary device uses a light emitting diode (LED) due to the efficiency and output provided by the LED relative to the input required. Additionally, a lens (not shown) may be disposed over the opening 56 to further diffuse, or alternatively focus, the light emitted from the light source 60.

Along an outer portion of the upper housing 53 is an aperture 62 having a photo sensor 64 therein. The photo sensor 64 may be a photo resistor wired in parallel to a hard resistor of 100 k ohms, for example. The photoresistor's electrical resistance varies in response to the amount of light present. According to the exemplary embodiment, if a great deal of ambient light is present, the value of resistance in the photocell is greater than 100 k, causing the signal to seek the path of least resistance and pass directly to ground. Thus the light source 60 never receives the "on" signal. Contrariwise, if it is dark, the resistance of the photocell is less than 100 k, causing the signal to take the path through the photocell, allowing it to pass on to the LED controller, lighting the LED. In short, if enough daylight is present in the area of the remote lighting unit 50, and the light source 60 will not be illuminated so that the batteries powering the remote light unit 50 are not drained needlessly.

Figure 5:
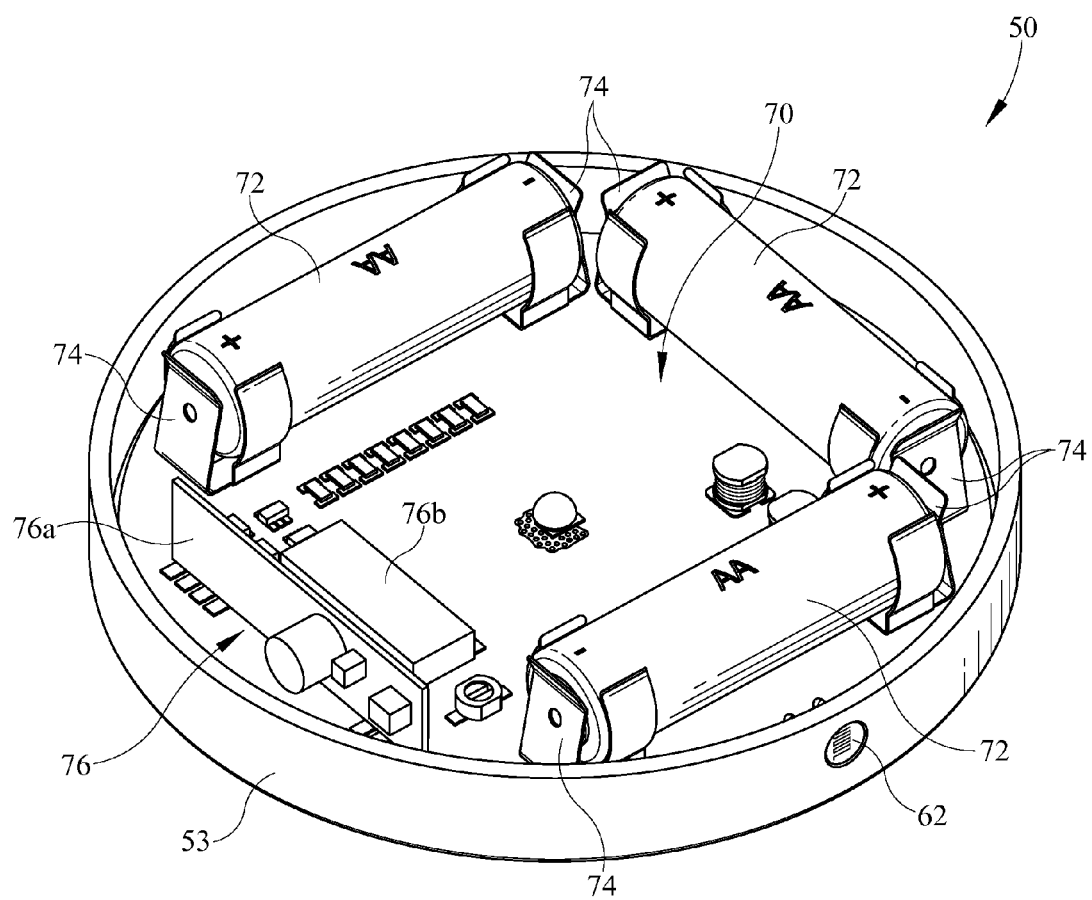
FIG. 5 is a perspective view of the remote lighting unit with a portion of the housing and a reflector removed.

Referring now to FIG. 5, the remote lighting unit 50 is depicted. The remote lighting unit 50 comprises an internal circuit board 70. The circuit board 70 maybe formed of aluminum or reinforced fiberglass, commonly known as FR-04 board, although alternate materials may be used. Mounted to the circuit board 70 is at least one battery 72 which is positioned within at least one battery lead 74.

Also disposed on the internal circuit board 70 is a receiver structure 76. The receiver structure 76 comprises a decoder 76a and receiver 76b. The receiver 76b receives the signal transmitted from the transmitter structure 28 (FIG. 3) and the decoder 76b decodes the RF signal. Based on this decoded signal, a determination is made whether remote lighting unit lamp 60 should be illuminated due to power loss conditions. The decision making may occur through analog or digital means. As previously stated with respect to the base unit 20, the remote lighting unit 50 may utilize alternate structure and circuitry to perform the desired function and therefore the present description should not be considered limiting but instead should be considered exemplary.

Figure 6:
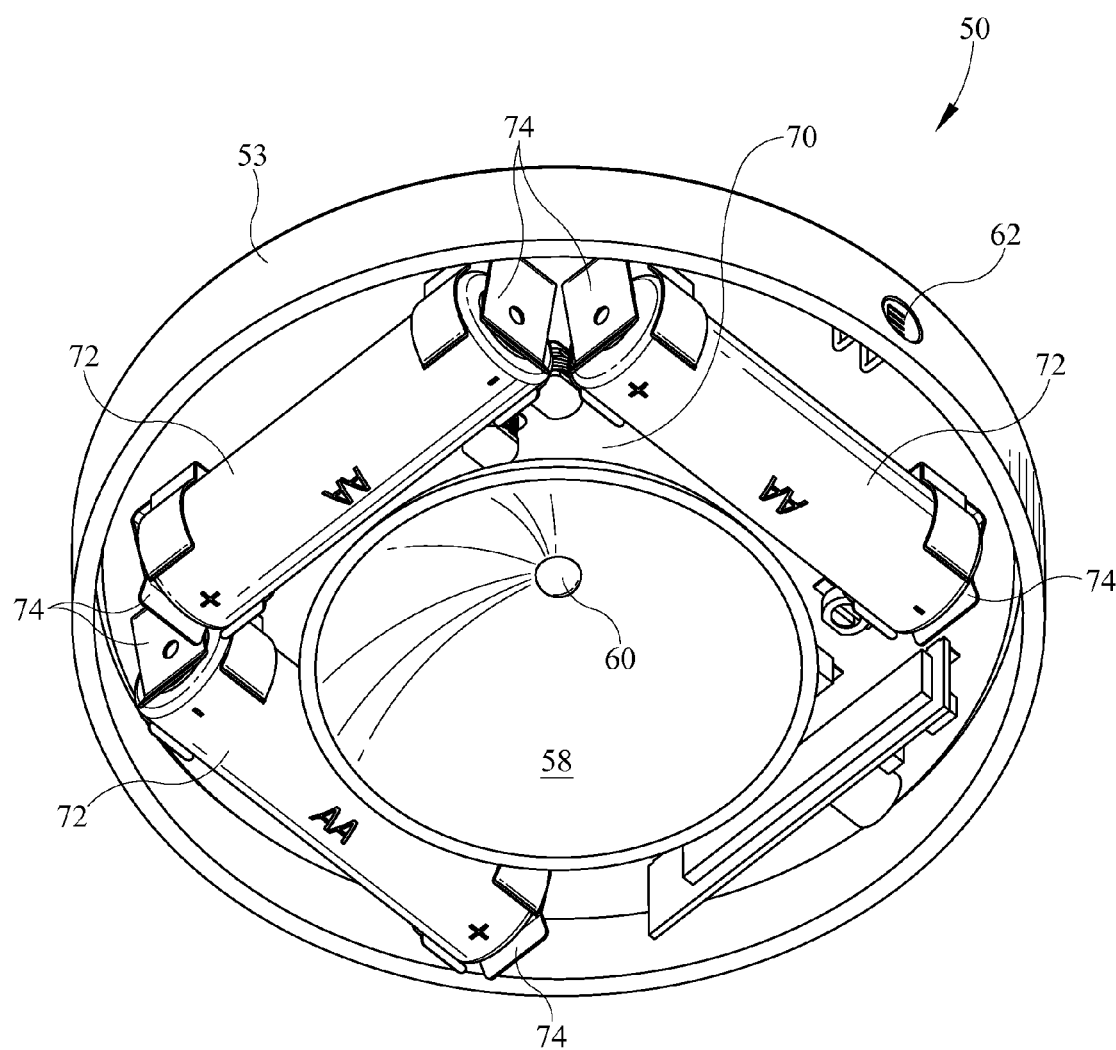
FIG. 6 is a lower perspective view of the remote lighting unit with a portion of the housing removed.

Referring now to FIG. 6, the lower portion of the housing 50 is removed and the upper portion is depicted with the circuit board 70 disposed therein and the diffuser or reflector 58 positioned about the LED lamp 60. The upper housing 53 may be positioned on a ceiling or wall by fastener or by adhesive. Once the base unit 20 is plugged into a power outlet, the system 10 begins to operate.

In operation, and referring first to FIG. 7, the system 10 functions as follows. In operation, the base unit 20 is plugged into an AC outlet and receives power from a power supply within the building. The base unit monitors the power supply and determines when the voltage drops indicating a loss of power in the building from the AC power supply. According to one embodiment, the base unit 20 transmits a signal during the condition of a power outage which is received by the remote light unit 50. When such signal is received by the remote lighting unit the internal circuitry of the remote light unit 50 causes battery powered illumination of the lamp 60.

Figure 7:
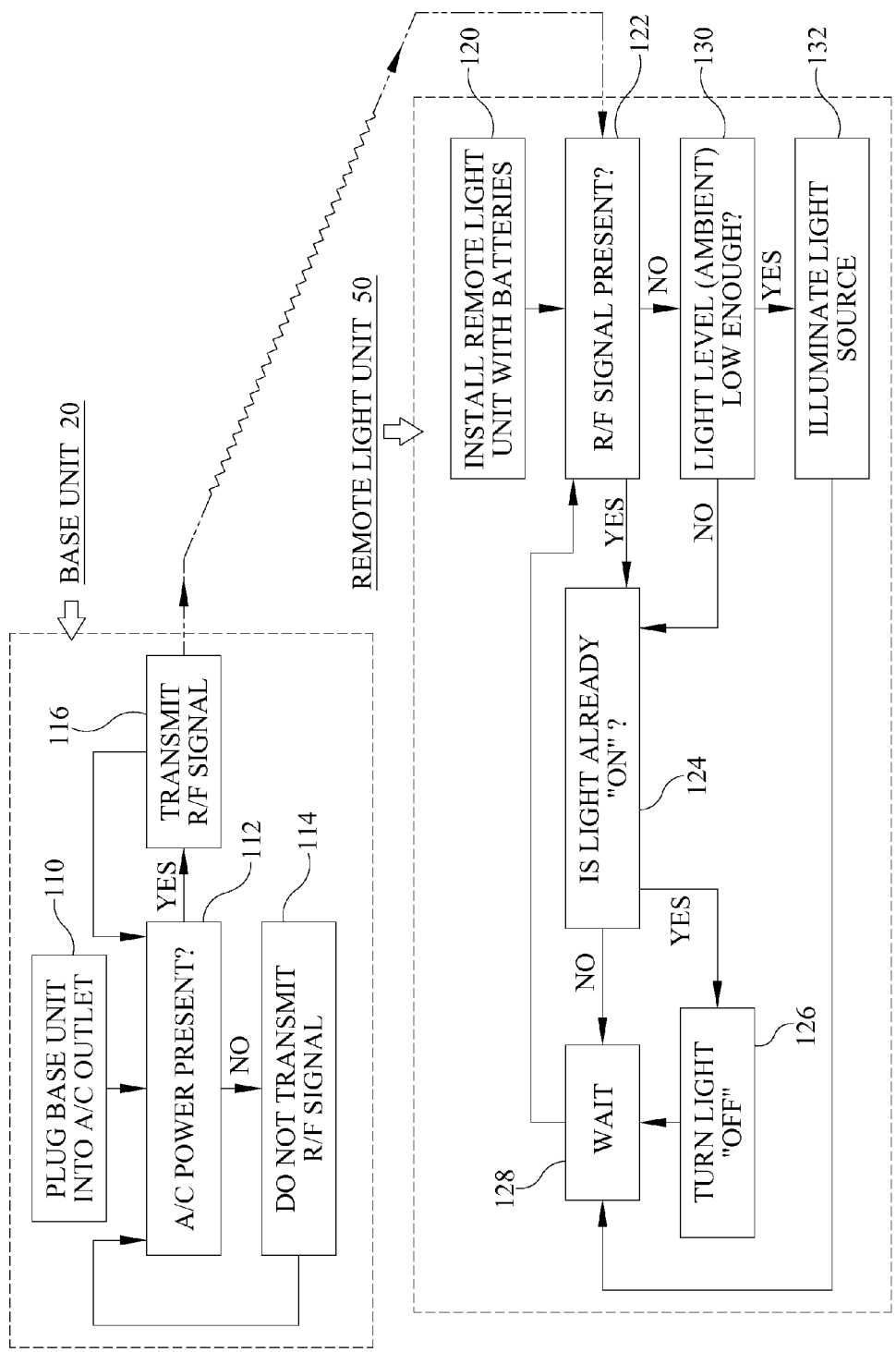
FIG. 7 is a first flow chart depicting a process for operation of the wireless convenience lighting system; and, FIG. 8 is a second flow chart depicting an alternate process for operation of the wireless convenience lighting system.

Referring now to FIG. 7, a first flowchart depicting the method of operating the wireless convenience lighting system 10 is depicted. Initially, the base unit 20 is plugged into an AC outlet at step 110. The base unit 20 detects whether AC power is present at step 112. According to this first embodiment, if the base unit 20 does not detect any AC power present, the base unit does not transmit an RF signal in step 114. Next, the system leaps back to step 112 to check again whether AC power is present at step 112. This loop may occur instantaneously or may occur following a preselected delay in time. However, if AC power is detected at the first pass through step 112, the base unit transmits a radio frequency signal at step 116. Again, the logic loops back to step 112 to again check for AC power. This may occur instantaneously or may occur after a preselected delay in time.

Next, assuming the remote lighting unit 50 has been installed with batteries in step 120, the remote lighting unit determines whether an RF signal is present at step 122. If the RF signal is present, the remote light unit 50 next determines whether the light source 60 is on at step 124. If the light source is on, then the light is turned off at step 126. Alternatively, if the light source is off, then the system waits at step 128 before leaping back to step 122 to again determine whether the RF signal is present at step 122. If the answer is initially no during the initial pass through step 122, the remote light unit determines whether the ambient light level is low enough to require the light source 60 to be turned on at step 130. If the light level is low enough, the light source 60 is turned on at step 122, and the logic loops back through step 128 to step 122. However, if the light level is not low enough the light source 60 will turn off In summary, the process shown in FIG. 7 operates to continuously send a signal and the signal change condition occurs when the remote lighting until 50 detects that the signal has been stopped.

Figure 8:
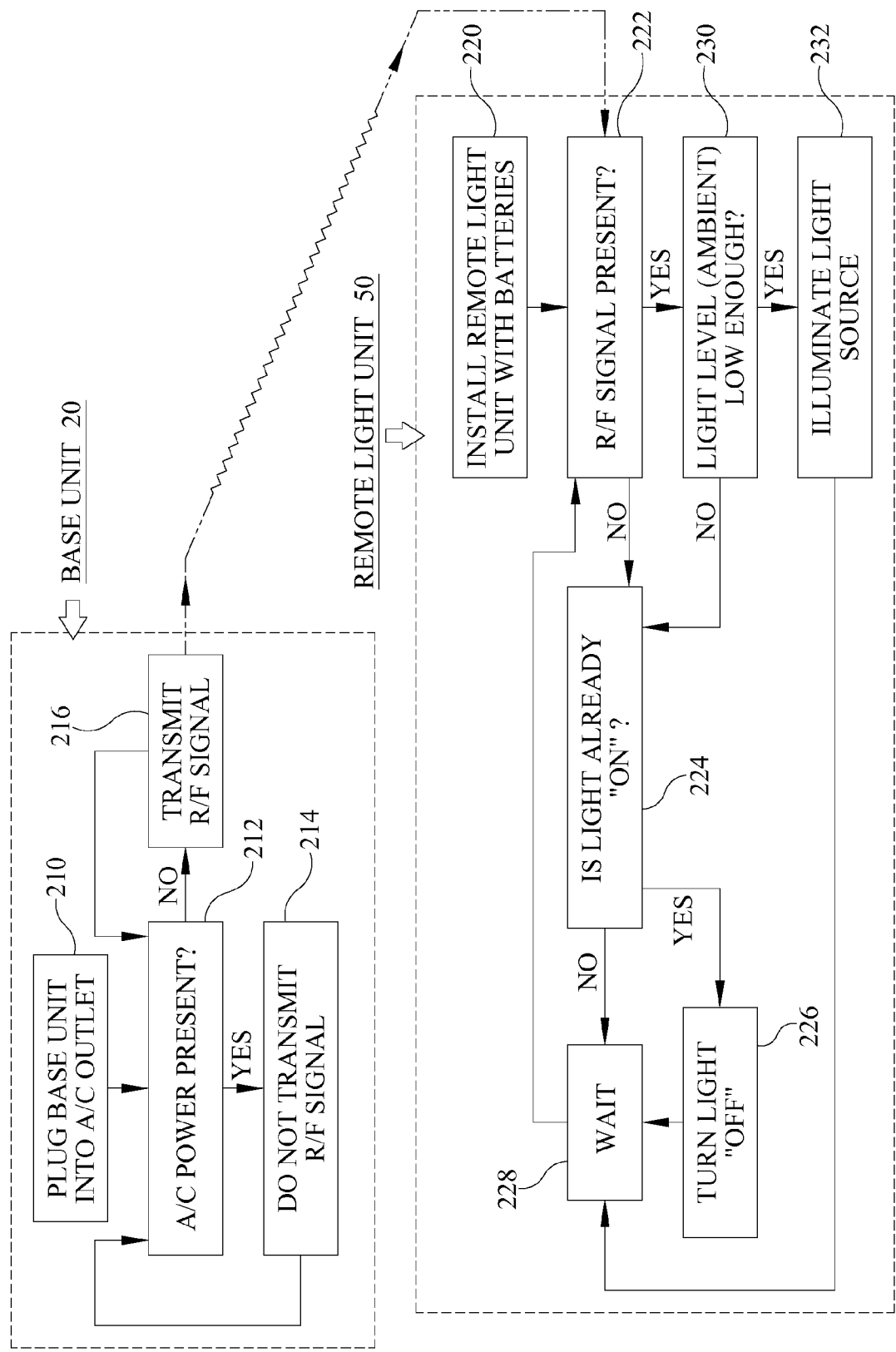

Referring now to FIG. 8, an alternative method of operating the wireless convenience lighting system 10 is depicted. According to this embodiment, the signal is normally off and the signal change condition occurs when the signal is detected by the remote lighting unit 50. Initially at the base unit 20, the base unit is plugged into an AC outlet at step 210. Next, the base unit 20 determines whether AC power is present at step 212. If the base unit 20 determines that AC power is present, the system does not transmit an RF signal at step 214. However, if AC power is determined to not be present, the base unit 20 transmits an RF signal in step 216. In either of steps 214 or 216, the logic loops back to step 212 to continuously determine whether AC power is present.

At step 216, the RF signal is transmitted wirelessly to be received by the remote lighting unit 50. At the remote lighting unit 50, assuming the batteries have been installed in step 220, the remote lighting unit determines whether an RF signal is present at step 222. If the RF signal is detected, the unit 50 determines whether the light is already on at step 224. If the light is already on, the light is turned off at step 226. Alternatively, if the light is not on, the device waits at step 228 and leaps back to step 222 for a second or subsequent pass through the logic flowchart. Alternatively, if at the first pass through step 222 the RF signal is detected, the unit 50 determines whether the ambient light level is low enough to require the light to be turned on. If the ambient light level is low enough, the light source is turned on at step 232. If the light level is not low enough, the unit moves to step 224 to continue the loop through the RF signal detection at step 222. This provides that a step is always available to turn off the light source 60 when the ambient light rises above a preselected level.

According to this second, alternative embodiment, the base unit 20 sends a signal to the remote light unit 50 upon a loss of power. Thus the signal condition change is indicated by a sending of the wireless signal when the base unit detects this loss of power. Upon detecting the signal, indicating the power outage condition, the luminaire 60 is illuminated by the remote lighting unit 50. Upon restoration of AC power to the base unit, another signal is sent to the remote light unit instructing it to turn off According to an additional option, the signal may be continuously on in a first signal condition. When the power loss is detected, a second different signal may be sent to the remote light unit 50. Thus the signal state may be on-on but different signal provided in each state to differentiate the first signal state from the second signal state.

The foregoing description of structures and methods has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. A method of wirelessly illuminating an area, comprising the acts of:
    providing a plug-in wall unit and a remote lighting unit;
    monitoring an AC power supply with said plug-in wall unit;
    transmitting a signal by the plug-in wall unit when AC power from the AC power supply is detected by said plug-in wall unit:
    stop transmitting the signal when the AC power is not detected;
    monitoring for a change in said signal from said plug-in wall unit to said remote lighting unit if a change of the AC power occurs including determining that the signal is not received by the remote lighting unit; and
    illuminating a light source in said remote lighting unit when said signal is not received by the remote lighting unit.

2. The method of claim 1 further comprising a step of monitoring ambient light in the area of said remote light unit.

3. The method of claim 2 further comprising a step of inhibiting illumination of said light source if said ambient light is above a preselected level.

4. The method of wirelessly illuminating an area of claim 1 wherein said signal is an RF signal.

5. A method of wireless illumination, comprising the acts of:
    plugging-in a power sensing base module into a first power supply;
    monitoring said first power supply with said base module;
    transmitting a signal from said base module to a remote lighting unit when power from said first power supply is detected;
    detecting a loss of the power from said first power supply;
    stop transmitting the signal in response to the detecting act; and
    illuminating said remote light unit powered by a second power supply on-board said remote light unit when the signal is not received by said remote lighting unit.

6. A method of wireless illumination comprising the acts of:
    monitoring a first power supply with a plug-in base unit;
    transmitting a signal when power is received by the plug-in base unit from the first power supply;
    detecting a loss of the power from the first power supply;
    stop transmitting the signal in response to the detecting act;
    determining an ambient light level in an area of a remote lighting unit; and
    illuminiating said remote lighting unit if said ambient light level is below a preselected level and the signal is not received by the remote lighting unit.

* * * * *